(12) United States Patent
Shi et al.

(10) Patent No.: US 12,092,997 B2
(45) Date of Patent: Sep. 17, 2024

(54) HIGH-PRECISION TIME SYNCHRONIZATION SYSTEM AND METHOD USING VIRTUAL ATOMIC CLOCKS

(71) Applicant: Beihang University, Beijing (CN)

(72) Inventors: Chuang Shi, Beijing (CN); Fu Zheng, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/537,937

(22) Filed: Dec. 13, 2023

(65) Prior Publication Data

US 2024/0231284 A1    Jul. 11, 2024

(30) Foreign Application Priority Data

Jan. 9, 2023    (CN) .......................... 202310028301.4

(51) Int. Cl.
  *G04R 20/02*    (2013.01)
  *G04F 5/14*    (2006.01)
(52) U.S. Cl.
  CPC .............. *G04R 20/02* (2013.01); *G04F 5/14* (2013.01)
(58) Field of Classification Search
  CPC ............ G04R 20/02; G04F 5/14; Y02A 90/10
  USPC .......................................................... 702/89
  See application file for complete search history.

(56) References Cited

U.S. PATENT DOCUMENTS

| | | | | |
|---|---|---|---|---|
| 7,711,480 | B2* | 5/2010 | Robbins | G01C 21/28 |
| | | | | 701/476 |
| 10,903,924 | B2* | 1/2021 | Guendert | H04J 3/12 |
| 2023/0024329 | A1* | 1/2023 | Park | H04J 3/0667 |

OTHER PUBLICATIONS

CNIPA, Notification of First Office Action for CN202310028301.4, May 26, 2023.
BeiHang University (Applicant), Response to Notification of First Office Action for CN202310028301.4, with (allowed) claims, Jun. 13, 2023.
CNIPA, Notification to grant patent right for invention in CN202310028301.4, Aug. 1, 2023.

* cited by examiner

*Primary Examiner* — John H Le
(74) *Attorney, Agent, or Firm* — Zhigang Ma

(57) ABSTRACT

A high-precision time synchronization (HTS) system and method using virtual atomic clocks (VACs) includes: providing an implementation of VAC generation method: accessing the high-precision time service provided by the WPT system, solving receiver clock offsets and reconstructing reference stations observations; providing a rapid HTS method: using the VAC information to realize rapid HTS by means of pseudorange or carrier phase CV time transfer; obtaining a HTS system using VACs, including a real-time observations receiving and distributing module, a differential corrections receiving and decoding module, a local clock solving module, a GNSS observations reconstruction module, and a VAC data broadcasting module. Aiming at VACs don't have the function of time-keeping, and GNSS is easy to be interrupted by factors such as environmental and network anomalies, and a VAC is unable to continuously provide high-precision time service, combing VACs is proposed to safeguard the continuity and reliability of the time-frequency service system.

3 Claims, 1 Drawing Sheet

HIGH-PRECISION TIME SYNCHRONIZATION SYSTEM AND METHOD USING VIRTUAL ATOMIC CLOCKS

TECHNICAL FIELD

The disclosure relates to the field of high-precision time service for satellite navigation, and more particularly to a high-precision time synchronization system and method using virtual atomic clocks.

BACKGROUND

Benefited by the advantages of wide coverage, all-weather and low cost, satellite navigation has become an effective means of high-precision time synchronization technology. After the Common-view (CV) method, the All-in-View (AV) method and the Precise Point Positioning (PPP) Method, the accuracy of high-precision time synchronization based on satellite navigation can achieve the nanosecond or even sub-nanosecond level. The PPP time transfer method integrates the use of precise satellite orbits, satellite clock products and carrier phase observations, and can accomplish sub-nanosecond time transfer, which is one order of magnitude higher than the CV method or AV method. Among them, a wide-area precise timing (WPT) system and method point out that a globally time service better than 1 nanosecond can be achieved by using the WPT system.

Both CV method and PPP method need to introduce high-precision time reference. The CV method requires introducing high-precision frequency standards as the time reference source, such as rubidium clocks, cesium clocks, etc., while the PPP method requires high-precision satellite orbits and clock products to generate time reference information. Accordingly, it leads each of the two techniques to have its own advantages and disadvantages.

CV method: due to the introduction of atomic clocks as time reference, the cost of deployment, operation and maintenance is high; the technical system relies on the spatial correlation of errors, which determines that the method is only applicable to a local area range, and with the increase of the baseline distance, the performance of time synchronization will gradually decline; to achieve a wide-area applications, it is necessary to introduce multiple atomic clocks, which significantly increases the construction cost, and causes it difficult to achieve real-time high-precision time comparison between atomic clocks, so the consistency of time synchronization in a wide area cannot be guaranteed; but this method is relatively easy to accomplish, and can achieve nanosecond level time synchronization and sub-nanosecond level time synchronization services can be achieved by the carrier phase-based CV synchronization.

PPP method: Compared with the CV method, PPP method can achieve sub-nanosecond time synchronization on a global scale. The patent a wide-area precision time service WPT system and method discloses a high-precision time service system and method based on global navigation satellite system (GNSS), which can provide traceable high-precision time service products for global users and achieve sub-nanosecond level time synchronization. But this method requires refined handling of series errors in the time transfer process, otherwise it is difficult to guarantee the service performance; on the other hand, the PPP method requires a long initialization time, making it difficult to meet the demand for rapid time service in kinematic or dynamic scenarios.

Compared with GNSS time and frequency applications, GNSS positioning services are developing more rapidly. There are hundreds of thousands of GNSS reference stations globally, and there are tens of thousands of GNSS reference stations in China, too. However, the existing network of reference stations focuses on high-precision positioning service, which can support rapid centimeter-level positioning, and only some of the reference stations are equipped with atomic clocks which are not synchronized with the network of atomic clock stations, making it difficult to meet the demand for high-precision time synchronization services.

SUMMARY

This patent provides a high-precision time synchronization system and method of virtual atomic clocks to solve problems in the existing technology. It can continuously provide high-precision time service and guarantee the continuity and reliability of a time and frequency service system.

To solve the technical problems above, on the one hand, the patent provides an implementation method of generating virtual atomic clock observations, which includes: access precise time service information provided by the WPT system, solve reference stations network clock information, and reconstruct reference stations observations;

In an embodiment, the satellite observations of the reference stations are expressed as follows:

$$P_i^s = \rho_i^s + c \cdot (t_i - t^s) + trop^s + iono_i^s + \varepsilon_{P_i}^s \quad (1)$$

$$L_i^s = \lambda_i \cdot \varphi_i^s = \rho_i^s + c \cdot (t_i - t^s) + trop^s - iono_i^s + \lambda_i \cdot N_i^s + \varepsilon_{\varphi_i}^s \quad (2)$$

where s represents the satellite, i represents the satellite signal frequency point, $P_i^s$ represents the pseudorange observations from the satellite to the receiver, $L_i^s$ represents the ranging of the carrier phase observations, $\varphi_i^s$ represents the carrier phase observations from the satellite to the receiver, $\lambda_i$ represents the carrier wavelength at frequency i, $\rho_i^s$ represents the geometric distance from the satellite to the receiver, c represents the speed of light, $t_i$ represents the receiver clock offset, $t^s$ represents the satellite clock offset, $trop^s$ represents tropospheric delay, $iono_i^s$ represents ionospheric delay, $N_i^s$ represents integer ambiguity, $\varepsilon_{P_i}^s$ represents pseudorange observation noise, and $\varepsilon_{\varphi_i}^s$ represents carrier phase observation noise.

In an embodiment, solving the clock information of the reference stations network includes: using the precise time service information provided by the WPT system for solving, adopting the ionosphere-free combination to effectively eliminate the influence of ionospheric delay, and obtaining the ionosphere-free combination observation equations based on (1)-(2) as follows:

$$P_{IF}^s = \rho_{IF}^s + c \cdot \left(t_{IF} - t^{s,IF}\right) + trop^s + \varepsilon_{P_{IF}}^s \quad (3)$$

$$L_{IF}^s = \lambda_{IF}\varphi_{IF}^s = \rho_{IF}^s + c \cdot \left(t_{IF} - t^{s,IF}\right) + trop^s + \lambda_{IF}N_{IF}^s + \varepsilon_{\varphi_{IF}}^s \quad (4)$$

After eliminating the ionospheric delay, the precise satellite orbit and satellite clock corrections provided by the WPT system are used for correction, and the final parameters to be estimated receiver clock $t_{IF}$, the tropospheric zenith information and the ionosphere-free ambiguity information are processed by Kalman filtering method.

Further, check the ionosphere-free ambiguity of the specific station estimation by using the double-difference ambiguity of reference stations, decompose the ionosphere-free combination ambiguity into wide-lane ambiguity and narrow-lane ambiguity, select the double-difference ambiguity between the independent baseline-fixed reference stations, and express the double-difference ambiguity between the stations by using A, B to denote the reference stations A and B, and j and k to denote the satellite numbers, then the double-difference ambiguity composed of the stations A, B, and the satellites j, k is denoted by $\Delta\nabla N_{A,B}^{j,k}$. For a GNSS network with R reference stations and s satellites, the associated fixed double-difference ambiguity $\Delta\nabla N_{A,B}^{j,k}$, the carrier phase observation equation information of all the reference stations $\delta L_R^s$, and the clock information of the reference stations iteratively estimated by the whole network $t_{IF,R}$ are expressed as follows:

$$\begin{cases} \delta L_A^j = c \cdot t_{IF,A} + trop_A^j + \lambda_{IF} N_A^j \\ \delta L_A^k = c \cdot t_{IF,A} + trop_A^k + \lambda_{IF} N_A^k \\ \vdots \\ \delta L_A^s = c \cdot t_{IF,A} + trop_A^s + \lambda_{IF} N_A^s \\ \delta L_B^j = c \cdot t_{IF,B} + trop_B^j + \lambda_{IF} N_B^j \\ \delta L_B^k = c \cdot t_{IF,B} + trop_B^k + \lambda_{IF} N_B^k \\ \vdots \\ \delta L_B^s = c \cdot t_{IF,B} + trop_B^s + \lambda_{IF} N_B^s \\ \Delta\nabla N_{A,B}^{j,k} = \left(N_A^j - N_A^k\right) - \left(N_B^j - N_B^k\right) \\ \vdots \\ \Delta\nabla N_{A,R}^{j,s} = \left(N_A^j - N_A^s\right) - \left(N_R^j - N_R^s\right) \end{cases} \quad (5)$$

In an embodiment, reconstructing the observations of reference stations includes: calculating $t_{IF}$ from Eq. (5), and bringing it into Eqs. (1) and (2) to reconstruct the reference station pseudorange and carrier phase observation equations:

$$\tilde{P}_i^s = \rho_i^s + c \cdot (\delta t_i - t^s) + trop^s + iono_i^s + \varepsilon_{P_i}^s \quad (6)$$

$$\tilde{L}_i^s = \lambda_i \cdot \tilde{\varphi}_i^s = \rho_i^s + c \cdot (\delta t_i - t^s) + trop^s - iono_i^s + \lambda_i N_i^s + \varepsilon_{\varphi_i}^s \quad (7)$$

Where $\delta t_i$ represents the difference between the frequency i clock and ionosphere-free clock $t_{IF}$, we will encode the reconstructed information in the standard of RTCM (Radio Technology Committee of Marine) format.

Further, the reference stations use some reference stations' observations to generate virtual grid points, and to generate the virtual atomic clock information corresponding to each reference station by repeating generating virtual atomic clock observations.

On the other hand, this invention provides a method of rapid high-precision time synchronization, the method comprising: using virtual observation atomic clock information generated at a service end to realize rapid high-precision time synchronization within the coverage area of a reference stations network by means of pseudo-range CV time transfer and carrier phase CV time transfer.

In an embodiment, the pseudo-range CV time transfer comprises: adopting a phase-smoothing pseudo-range method to reduce the noise of pseudo-range observation values, selecting a dual-frequency pseudo-range ionosphere-free combination based on the distance between the reference stations and the time-frequency synchronization terminal, and selecting the observation values according to the high cut-off elevation and solving their single difference to achieve high-precision time synchronization;

where the corresponding ionosphere-free combination observations for virtual atomic clocks and time terminals of user are shown in Eqs. (8) and (9), using 'atom' and 'user' to distinguish the ionosphere-free combination observations for virtual atomic clocks and user time terminals, respectively:

$$\tilde{P}_{IF,atom}^s = \rho_{IF,atom}^s + c \cdot \left(\delta t_{IF,atom} - t^{s,IF}\right) + trop^s + \varepsilon_{P_{IF,atom}}^s \quad (8)$$

$$P_{IF,user}^s = \rho_{IF,user}^s + c \cdot \left(\delta t_{IF,user} - t^{s,IF}\right) + trop^s + \varepsilon_{P_{IF,user}}^s \quad (9)$$

For a user time terminal with known coordinates, the coordinate information can be substituted into Eq. (9), and then the clock information of the user time terminal can be obtained through the single difference between the stations (e.g., Eq. 10) as follows:

$$\Delta P_{IF}^s = \Delta \rho_{IF}^s + c \cdot (\delta t_{IF,user} - \delta t_{IF,atom}) + \Delta \varepsilon_{P_{IF}}^s \quad (10)$$

For a user time terminal whose coordinate information is unknown, we can solve the user coordinate information by double-difference observations, then use Eq. (10) to obtain the clock information of the user time terminal, and finally deduct the hardware time delay calibration value of the user time terminal to realize nanosecond level time synchronization of the user time terminal.

In an embodiment, the carrier phase CV time transfer comprises: selecting dual-frequency observations for time transfer based on the distance between the virtual atomic clock and the time-frequency synchronization terminal, and giving a carrier ionosphere-free combination observation of the virtual atomic clock and the user time terminal respectively, as shown in Eqs. (11) and (12).

$$\tilde{L}_{IF,atom}^s = \rho_{IF,atom}^s + c \cdot \left(\delta t_{IF,atom} - t^{s,IF}\right) + trop^s + \lambda_{IF} N_{IF,atom}^s + \varepsilon_{\varphi_{IF,atom}}^s \quad (11)$$

$$L_{IF,user}^s = \rho_{IF,user}^s + c \cdot \left(\delta t_{IF,user} - t^{s,IF}\right) + trop^s + \lambda_{IF} N_{IF,user}^s + \varepsilon_{\varphi_{IF,user}}^s \quad (12)$$

We use the double-difference carrier phase ambiguity fixing method to solve the high-precision position information of the time user terminal, further determine the single-difference ambiguity by the double-difference ambiguity. We introduce the pseudo-range single-difference observations, determine the single-difference time reference after smoothing multiple calendar elements and solve the single-difference ambiguity information of the satellite with the highest elevation angle. Then we introduce the double-difference ambiguity constraint information to achieve the high-precision time transfer based on the carrier phase as shown in Eq. (13):

$$\Delta L_{IF}^s = \Delta \rho_{IF}^s + c \cdot (\delta t_{IF,user} - \delta t_{IF,atom}) + \Delta \varepsilon_{L_{IF}}^s \quad (13)$$

Finally, the hardware time delay calibration value of the user time terminal is deducted to achieve sub-nanosecond level time synchronization of the user time terminal.

A high-precision time synchronization system with virtual atomic clocks includes a GNSS real-time observations receiving and distributing module, a differential corrections receiving and decoding module, a local clock solving module of the reference stations network, a GNSS observations reconstruction module, and a virtual atomic clock data broadcasting module;

The GNSS real-time observations receiving and distributing module introduced above is used to access and distribute satellite navigation observations from GNSS reference stations and time user terminals.

The differential corrections receiving and decoding module introduced above is used to access the time service corrections generated by the WPT system and decode them;

The local clock solving module of the reference stations network introduced above is used to solve the local clock offsets in parallel based on the original observation data of the reference stations network and the decoded differential corrections, using the WPT high-precision time transfer method to correct various errors of the link;

The GNSS observations reconstruction module introduced above is used to deduct the local clock errors obtained by solving, regenerate the reference stations network observations and encode the reference stations network observation data in accordance with the RTCM format;

The data broadcasting module introduced above is used to encode and broadcast high-precision time service information to a time user.

Compared with the related technology, this invention has the following beneficial effects.

It does not rely on atomic clocks, reprocesses on the basis of the existing GNSS reference stations network, meets the demand for high-precision time-frequency synchronization, and significantly reduces the construction cost of the time-frequency service system;

High-precision spatial and temporal integration services have been realized, which can simultaneously satisfy real-time decimeter and centimeter level positioning and nanosecond and sub-nanosecond level time synchronization.

DETAILED DESCRIPTION OF EMBODIMENTS

Figure 1:
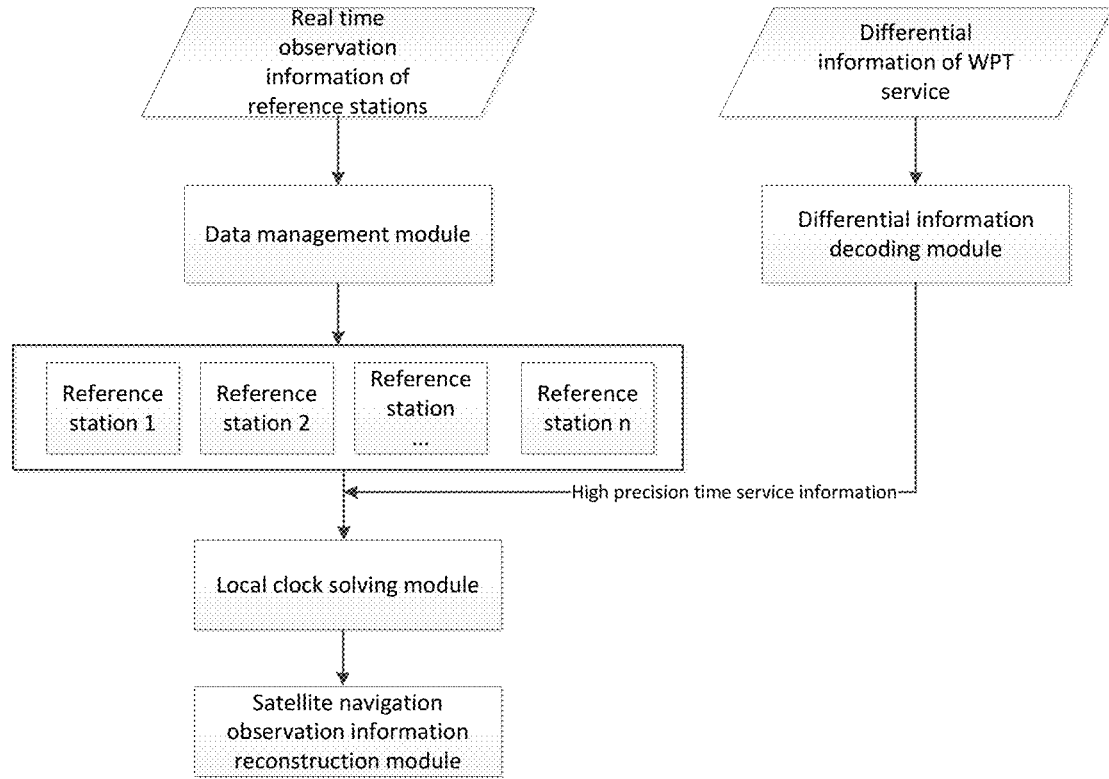
FIG. 1 shows a flowchart of a high-precision time synchronization method for virtual atomic clocks of this invention.
Figure 2:
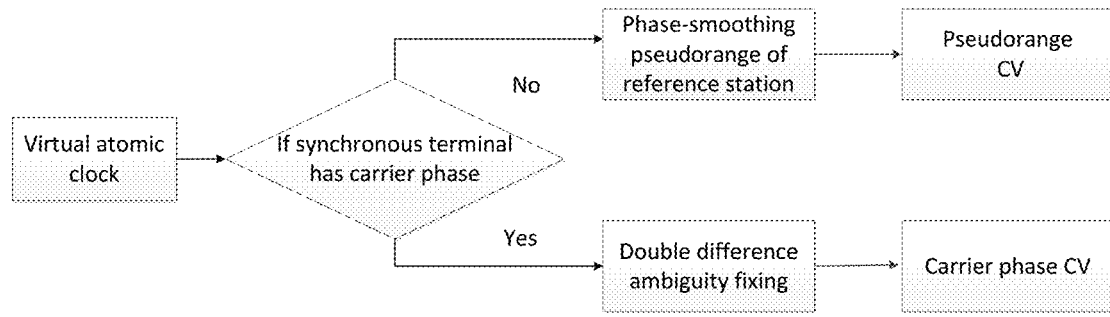
FIG. 2 shows a high-precision time synchronization method of this invention based on virtual atomic clocks.

The technical solutions in the embodiments of this invention will be clearly and completely described below in conjunction with FIG. 1-FIG. 2, and it is clear that the embodiments described are only a part of the embodiments of this invention and not all of them, and that the technical means used in the embodiments are conventional means known to those skilled in the art, if not specifically indicated.

The terms "including" and "having" and any variations thereof in the embodiments of the disclosure are intended to cover non-exclusive inclusion, for example, a process, method, system, product, or device that includes a series of steps or modules needs not be limited to those clearly listed steps or modules, but may include other steps or modules that are not clearly listed or inherent to the process, method, product, or device.

This invention provides a high-precision time synchronization method based on GNSS reference stations, comprising the following processes:

S1: Generation of virtual atomic clock observations. By accessing the high-precision time service information provided by the WPT system, the clock information of the reference stations network is solved and the reference stations' observations is reconstructed. Without loss of generality, the satellite observations of the reference stations are expressed as follows:

$$P_i^s = \rho_i^s + c \cdot (t_i - t^s) + trop^s + iono_i^s + \varepsilon_{P_i}^s \quad (1)$$

$$L_i^s = \lambda_i \cdot \varphi_i^s = \rho_i^s + c \cdot (t_i - t^s) + trop^s - iono_i^s + \lambda_i \cdot N_i^s + \varepsilon_{\varphi_i}^s \quad (2)$$

where s represents the satellite, i represents the satellite signal frequency point, $P_i^s$ represents the pseudo-range observations from the satellite to the receiver, $L_i^s$ represents the ranging of the carrier phase observations, $\varphi_i^s$ represents the carrier phase observations from the satellite to the receiver, $\lambda_i$ represents the carrier wavelength at frequency point i, $\rho_i^s$ represents the geometric distance from the satellite to the receiver, c represents the speed of light, $t_i$ represents the clock offsets of receiver, $t^s$ represents the clock offsets of satellite, $trop^s$ represents tropospheric delay, $iono_i^s$ represents ionospheric delay, $N_i^s$ represents integer ambiguity, $\varepsilon_{P_i}^s$, represents pseudo-range observation noise, and $\varepsilon_{\varphi_i}^s$ represents carrier phase observation noise. It should be noted that $t_i$ includes the receiver clock offsets and the hardware delay deviation at the corresponding frequency point, and $t^s$ includes the satellite clock offsets and the hardware delay deviation at the corresponding frequency point. The virtual atomic clock observations are generated as follows:

S11: Solve the clock information of the reference stations network. In order to achieve high-precision time synchronization, the reference station receiver clock needs to be traced back to the time reference in real time, and the high-precision time service information provided by the WPT system is used for solving. The ionosphere-free combination can effectively eliminate the influence of ionospheric delay. Based on Eqs. (1)-(2), the observation equations for the ionosphere-free combination are obtained as follows:

$$P_{IF}^s = \rho_{IF}^s + c \cdot (t_{IF} - t^{s,IF}) + trop^s + \varepsilon_{P_{IF}}^s \quad (3)$$

$$L_{IF}^s = \lambda_{IF}\varphi_{IF}^s = \rho_{IF}^s + c \cdot (t_{IF} - t^{s,IF}) + trop^s + \lambda_{IF}N_{IF}^s + \varepsilon_{\varphi_{IF}}^s \quad (4)$$

After eliminating the ionospheric delay, the high-precision satellite orbit and satellite clock corrections provided by the WPT system are used for correction, usually the satellite clock provided by the service system is based on the ionosphere-free combination, and here the elimination can be carried out directly, the tropospheric delay is expressed as a zenith-direction delay and mapping function, the empirical model is used to eliminate the dry delay, and the residual tropospheric zenith delay error is used as a parameter to be estimated. Further, to guarantee the reliable estimation of the receiver clock information, the coordinates of the reference stations are fixed. Therefore, the final parameters to be estimated: receiver clock $t_{IF}$, tropospheric zenith information and ionosphere-free ambiguity information, can be obtained by using Kalman filtering method.

The above method only realizes the receiver clock offsets estimation of the specific station. To realize the consistency of the receiver clock offsets traceability of the whole reference stations network, check the ionosphere-free ambiguity of the specific station estimation by using the double-difference ambiguity of reference stations. Decompose the ionosphere-free combination ambiguity into wide-lane ambiguity and narrow-lane ambiguity, and select the double-difference ambiguity between the independent baseline-fixed reference stations. Using A, B to denote the reference station A and reference station B, and j and k to denote the satellite numbers, the double-difference ambiguity composed of stations A and B and satellites j and k is denoted by $\Delta\nabla N_{A,B}^{j,k}$. For a GNSS network with R reference stations and s satellites, the associative fixed double-difference ambiguity $\Delta\nabla N_{A,B}^{j,k}$ and the carrier phase observation equation information of all the reference stations $\delta L_R^s$ as Eq. (4), the whole network iteratively estimates the clock information of the reference stations $t_{IF,R}$ which is specified as follows:

$$\begin{cases} \delta L_A^j = c \cdot t_{IF,A} + trop_A^j + \lambda_{IF} N_A^j \\ \delta L_A^k = c \cdot t_{IF,A} + trop_A^k + \lambda_{IF} N_A^k \\ \vdots \\ \delta L_A^s = c \cdot t_{IF,A} + trop_A^s + \lambda_{IF} N_A^s \\ \delta L_B^j = c \cdot t_{IF,B} + trop_B^j + \lambda_{IF} N_B^j \\ \delta L_B^k = c \cdot t_{IF,B} + trop_B^k + \lambda_{IF} N_B^k \\ \vdots \\ \delta L_B^s = c \cdot t_{IF,B} + trop_B^s + \lambda_{IF} N_B^s \\ \Delta\nabla N_{A,B}^{j,k} = (N_A^j - N_A^k) - (N_B^j - N_B^k) \\ \vdots \\ \Delta\nabla N_{A,R}^{j,s} = (N_A^j - N_A^s) - (N_R^j - N_R^s) \end{cases} \quad (5)$$

S12: Reconstruct the reference stations observations. Take $t_{IF}$ solved in Eq. (5) into Eqs. (1) and (2) to reconstruct the reference stations pseudo-range and carrier phase observation equations, as expressed in Eqs. (6) and (7).

$$\tilde{P}_i^s = \rho_i^s + c \cdot (\delta t_i - t^s) + trop^s + iono_i^s + \varepsilon_{P_i}^s \quad (6)$$

$$\tilde{L}_i^s = \lambda_i \cdot \tilde{\varphi}_i^s = \rho_i^s + c \cdot (\delta t_i - t^s) + trop^s - iono_i^s + \lambda_i N_i^s + \varepsilon_{\varphi_i}^s \quad (7)$$

where $\delta t_i$ denotes the difference between frequency i clock and the ionosphere-free clock $t_{IF}$ in the information. The reconstructed information is encoded in the standard RTCM format. It is noted particularly that, the reconstructed pseudo-range and carrier phase observations in Eq. (6) and Eq. (7) cannot be directly used for high-precision time synchronization because the influence of $\delta t_i$. Users need to adopt the dual-frequency ionosphere-free combination information, then realize the virtual atomic clocks traceable to the time reference.

In particular, the virtual atomic clock information generated by the above processes cannot maintain the accuracy of the time reference, and high precision time synchronization cannot be guaranteed once the satellite reference stations data are missing. To address this problem, the system can use multiple reference stations observations to generate virtual grid points, and then use the above processes to further generate virtual atomic clock information corresponding to each reference stations. This process can effectively avoid the problem of discontinuous virtual atomic clock information caused by hardware failure of a specific station, network failure and other factors, thus realizing continuous and reliable time synchronization service.

S2: Rapid high-precision time synchronization. Using the virtual observation atomic clock information generated on the server side, we will realize rapid and high-precision time synchronization within the coverage of the reference stations network, which includes the following processes:

S21: Pseudo-range CV time transfer. In view of the large noise of pseudo-range observations and the fact that virtual atomic clock data usually have both carrier phase and pseudo-range observations, firstly, the phase-smoothing pseudo-range method is adopted to further reduce the noise of pseudo-range observations; secondly, based on the distance between the reference stations and the time-frequency synchronization terminal, a dual-frequency pseudo-range ionosphere-free combination is selected, and the observations are selected according to the high cutoff elevation (e.g., 20°) for single-difference solving in order to realize high-precision time synchronization. The virtual atomic clock and the user time terminal correspond to each other. The corresponding ionosphere-free combination observation values of virtual atomic clock and user time terminal are shown in Eqs. (8) and (9), and 'atom' and 'user' are used to distinguish the ionosphere-free combination observation values of virtual atomic clock and user time terminal, respectively.

$$\tilde{P}_{IF,atom}^s = \rho_{IF,atom}^s + c \cdot (\delta t_{IF,atom} - t^{s,IF}) + trop^s + \varepsilon_{P_{IF},atom}^s \quad (8)$$

$$P_{IF,user}^s = \rho_{IF,user}^s + c \cdot (\delta t_{IF,user} - t^{s,IF}) + trop^s + \varepsilon_{IF,user}^s \quad (9)$$

For a user time terminal with known coordinates, the coordinate information can be substituted into Eq. (9), and then the clock information of the user time terminal can be obtained through the single difference between stations (as in Eq. 10) as follows:

$$\Delta P_{IF}^s = \Delta \rho_{IF}^s + c \cdot (\delta t_{IF,user} - \delta t_{IF,atom}) + \Delta \varepsilon_{P_{IF}}^s \quad (10)$$

For the user time terminal whose coordinate information is unknown, the user coordinate information can be solved by double-difference observations, then the clock information of the user time terminal can be obtained by adopting Eq. (10), and it should be pointed out that at this time, due to the limitations of pseudo-range observation accuracy, the solved coordinates have errors, which in turn will affect the accuracy of the time information of the user time terminal. Finally, the hardware time delay calibration value of the user time terminal is deducted to achieve nanosecond-level time synchronization of the user time terminal.

S22: Carrier phase CV time transfer. Similar to the pseudo-range CV time transfer process, based on the distance between the virtual atomic clocks and the time-frequency synchronization terminal, the dual-frequency observations is selected for time transfer. Similar to Eqs. (8) and (9), the carrier phase ionosphere-free observations of the virtual atomic clock and the user time terminal are shown in Eqs. (11) and (12), respectively.

$$\tilde{L}^s_{IF,atom} = \rho^s_{IF,atom} + c \cdot \left(\delta t_{IF,atom} - t^{s,IF}\right) + trop^s + \lambda_{IF} N^s_{IF,atom} + \varepsilon^s_{\varphi IF,atom} \quad (11)$$

$$L^s_{IF,user} = \rho^s_{IF,user} + c \cdot \left(\delta t_{IF,user} - t^{s,IF}\right) + trop^s + \lambda_{IF} N^s_{IF,user} + \varepsilon^s_{\varphi IF,user} \quad (12)$$

To fully use the carrier phase observations, the double-difference carrier phase ambiguity fixing method is used to solve the high-precision position information of the time user terminal, which is similar to the traditional high-precision positioning method at this time. However, this method eliminates the time information and cannot realize high-precision time transfer. Therefore, it is necessary to further determine the single-difference ambiguity by double-difference ambiguity. Introducing the pseudo-range single-difference observations, multiple calendar elements are smoothed to determine the single-difference time reference, solving the single-difference ambiguity information of the satellite with the highest elevation angle, and then introducing the double-difference ambiguity constraint information, realizing the high-precision time transfer based on the carrier phase as shown in Eq. (13).

$$\Delta L^s_{IF} = \Delta \rho^s_{IF} + c \cdot (\delta t_{IF,user} - \delta t_{IF,atom}) + \Delta \varepsilon^s_{L_{IF}} \quad (13)$$

Further, the hardware time delay calibration value of the user time terminal is subtracted to achieve sub-nanosecond-level time synchronization of the user time terminal.

This invention can be applied, for example, to 5G/6G-oriented mobile communications, precise time-frequency metrology, railroad time-frequency systems, distributed radar, secondary radar, and other applicable areas.

This invention also includes a high-precision time synchronization system for virtual atomic clocks, comprising:

A high-precision time synchronization system with virtual atomic clocks includes a GNSS real-time observations receiving and distributing module, a differential corrections receiving and decoding module, a local clock solving module of the reference stations network, a GNSS observations reconstruction module, and a virtual atomic clock data broadcasting module;

The GNSS real-time observations receiving and distributing module: used to access and distribute GNSS observations from GNSS reference stations and time user terminals.

Differential corrections receiving and decoding Module: It is used to access the time service corrections generated by the WPT system then be decoded;

Local clock solving module of the reference stations network: Based on the original observation data of the reference stations network and the decoded differential corrections, the WPT high-precision time transfer method is used to correct the link errors and solve the local clock offsets in parallel;

GNSS observations reconstruction module: It is used to deduct the local clock errors obtained by solving, regenerate the observations of the reference stations network and encode the observation data of the reference stations network in accordance with the RTCM format;

Data broadcasting module: for encoding and broadcasting high-precision time service information to time users.

The above-described embodiments are only descriptions of the preferred way of this invention, not a limitation of the scope of this invention, and without departing from the design spirit of this invention, the various deformations, variations, modifications, and substitutions made by the person of ordinary skills in the field of the technical scheme of the present invention shall fall within the scope of the protection as determined by the claims of this invention.

What is claimed is:

1. A method for high-precision time synchronization of virtual atomic clocks, comprising the following steps:
    S1: generation of virtual atomic clock observations: by accessing high-precision time service information provided by a wide-area precise timing (WPT) system, clock information of a reference station network is solved and observations of reference stations of the reference station network are reconstructed;
    S2: rapid and high-precision time synchronization: using virtual observation atomic clock information generated by a server side to realize rapid and high-precision time synchronization within a coverage of the reference station network;
    wherein in S1, the observations of the reference stations are expressed as follows:

$$P^s_i = \rho^s_i + c \cdot (t_i - t^s) + trop^s + iono^s_i + \varepsilon^s_{P_i} \quad (1)$$

$$L^s_i = \lambda_i \cdot \varphi^s_i = \rho^s_i + c \cdot (t_i - t^s) + trop^s - iono^s_i + \lambda_i + N^s_i + \varepsilon^s_{\varphi_i} \quad (2)$$

where s represents a satellite, i represents a satellite signal frequency point, $P^s_i$ represents a pseudorange observation from the satellite to a receiver, $L^s_i$ represents a ranging of carrier phase observations, $\varphi^s_i$ represents the carrier phase observations from the satellite to the receiver, $\lambda_i$ represents a carrier wavelength at the satellite signal frequency point i, $\rho^s_i$ represents a geometric distance from the satellite to the receiver, c represents a speed of light, $t_i$ represents a clock offset of the receiver, $t^s$ represents a clock offset of the satellite, $trop^s$ represents tropospheric delay, $iono^s_i$ represents ionospheric delay, $N^s_i$ represents integer ambiguity, $\varepsilon^s_{P_i}$ represents pseudorange observation noise, and $\varepsilon^s_{\varphi_i}$ represents carrier phase observation noise;

wherein in S1, the following steps are taken when solving the clock information of the reference station network:

S11: solving the clock information of the reference station network: the high-precision time service information provided by the WPT system is used for solving, and effect of the ionospheric delay is effectively eliminated by adopting ionosphere-free combination, based on Eqs. (1) and (2), observation equations for the ionosphere-free combination are obtained as follows:

$$P^s_{IF} = \rho^s_{IF} + c \cdot \left(t_{IF} - t^{s,IF}\right) + trop^s + \varepsilon^s_{P_{IF}} \quad (3)$$

$$L^s_{IF} = \lambda_{IF} \varphi^s_{IF} = \rho^s_{IF} + c \cdot \left(t_{IF} - t^{s,IF}\right) + trop^s + \lambda_{IF} N^s_{IF} + \varepsilon^s_{\varphi_{IF}} \quad (4)$$

after eliminating the ionospheric delay, high-precision satellite orbit and clock corrections provided by the WPT system are used for correction, and a final to-be-estimated parameters receiver clock is $t_{IF}$, and tropospheric zenith delay and ionosphere-free ambiguities are processed by Kalman filtering method;

checking the ionosphere-free ambiguities of a specific station of the reference stations by using double-difference ambiguity of the reference stations;

decomposing the ionosphere-free ambiguities of the specific station into wide-lane ambiguity and narrow-lane ambiguity, and selecting double-difference ambiguity between independent baseline-fixed reference stations; and using A, B to denote a reference station A and a reference station B, and j and k to denote satellite numbers, the double-difference ambiguity composed of the stations A and B and the satellites j and k is denoted by $\Delta \nabla N_{A,B}^{j,k}$ for a global navigation satellite system (GNSS) reference station network with R reference stations and s satellites, by combining the double-difference ambiguity $\Delta \nabla N_{A,B}^{j,k}$ and carrier phase observation equation information of all the reference stations $\delta L_R^s$ as Eq. (4), a whole network iteratively estimates the clock information of the reference stations $t_{IF,R}$ which is specified as follows:

$$\begin{cases} \delta L_A^j = c \cdot t_{IF,A} + trop_A^j + \lambda_{IF} N_A^j & (5) \\ \delta L_A^k = c \cdot t_{IF,A} + trop_A^k + \lambda_{IF} N_A^k \\ \vdots \\ \delta L_A^s = c \cdot t_{IF,A} + trop_A^s + \lambda_{IF} N_A^s \\ \delta L_B^j = c \cdot t_{IF,B} + trop_B^j + \lambda_{IF} N_B^j \\ \delta L_B^k = c \cdot t_{IF,B} + trop_B^k + \lambda_{IF} N_B^k \quad ; \\ \vdots \\ \delta L_B^s = c \cdot t_{IF,B} + trop_B^s + \lambda_{IF} N_B^s \\ \Delta \nabla N_{A,B}^{j,k} = (N_A^j - N_A^k) - (N_B^j - N_B^k) \\ \vdots \\ \Delta \nabla N_{A,R}^{j,s} = (N_A^j - N_A^s) - (N_R^j - N_R^s) \end{cases}$$

wherein in step S1, the following steps are taken when reconstructing the observations of the reference stations:

S12: reconstructing the observations of the reference stations: bringing a parameter receiver clock $t_{IF}$ solved in Eq. (5) into Eqs. (1) and (2) to reconstruct pseudorange and carrier phase observations of the reference stations as follows:

$$\tilde{P}_i^s = \rho_i^s + c \cdot (\delta t_i - t^s) + trop^s + iono_i^s + \varepsilon_{P_i}^s \quad (6)$$

$$\tilde{L}_i^s = \lambda_i \cdot \tilde{\varphi}_i^s = \rho_i^s + c \cdot (\delta t_i - t^s) + trop^s - iono_i^s + \lambda_i N_i^s + \varepsilon_{\varphi_i}^s \quad (7)$$

where $\delta t_i$ denotes a difference between frequency i clocks and the parameter receiver clock $t_{IF}$; and
encoding reconstructed information in a standard radio technology committee of marine (RTCM) format;
wherein step S2 comprises the following steps:
S21: pseudo-range common-view (CV) time transfer: phase-smoothing pseudo-range method is adopted to reduce the pseudorange observation noise, and a dual-frequency pseudorange ionosphere-free combination is selected based on distances between the reference stations and a time-frequency synchronization terminal, and the observations are selected for single-difference solving according to a high cut-off elevation, to realize high-precision time synchronization;
where corresponding ionosphere-free combination observations for virtual atomic clocks and user time terminals are shown in Eqs. (8) and (9), using 'atom' and 'user' to distinguish the ionosphere-free combination observations for virtual atomic clocks and user time terminals, respectively:

$$\tilde{P}_{IF,atom}^s = \rho_{IF,atom}^s + c \cdot (\delta t_{IF,atom} - t^{s,IF}) + trop^s + \varepsilon_{P_{IF,atom}}^s \quad (8)$$

$$P_{IF,user}^s = \rho_{IF,user}^s + c \cdot (\delta t_{IF,user} - t^{s,IF}) + trop^s + \varepsilon_{IF,user}^s \quad (9)$$

for a user time terminal with known coordinates, the coordinate information is substituted into Eq. (9), and then the clock information of the user time terminal is obtained through the single-difference between stations as follows:

$$\Delta P_{IF}^s = \Delta \rho_{IF}^s + c \cdot (\delta t_{IF,user} - \delta t_{IF,atom}) + \Delta \varepsilon_{P_{IF}}^s \quad (10)$$

for a user time terminal whose coordinate information is unknown, the user coordinate information is solved by double-difference observations, and then Eq. (10) is used to obtain clock information of the user time terminal, and finally a hardware time delay calibration value of the user time terminal is deducted to realize nanosecond-level time synchronization of the user time terminal;

S22: carrier phase CV time transfer: based on a distance between a virtual atomic clock and the time-frequency synchronization terminal, the dual-frequency observations are selected for time transfer, and the carrier phase ionosphere-free combination observation of the virtual atomic clock and the user time terminal are given respectively, as shown in Eq. (11) and Eq. (12).

$$\tilde{L}_{IF,atom}^s = \rho_{IF,atom}^s + c \cdot (\delta t_{IF,atom} - t^{s,IF}) + trop^s + \lambda_{IF} N_{IF,atom}^s + \varepsilon_{\varphi_{IF,atom}}^s \quad (11)$$

$$L_{IF,user}^s = \rho_{IF,user}^s + c \cdot (\delta t_{IF,user} - t^{s,IF}) + trop^s + \lambda_{IF} N_{IF,user}^s + \varepsilon_{\varphi_{IF,user}}^s \quad (12)$$

wherein a double-difference carrier phase ambiguity fixing method is used to solve high-precision position information of the user time terminal, single-difference ambiguity is further determined by the double-difference ambiguity, pseudorange single-difference observations are introduced, single-difference time reference is determined after smoothing of multiple epochs; and solving single-difference ambiguity information of the satellite with a highest elevation angle; and
introducing double-difference ambiguity constraint information to achieve high-precision time transfer based on carrier phase as shown in Eq. (13); and $$\Delta L_{IF}^s = \Delta \rho_{IF}^s + c \cdot (\delta t_{IF,user} - \delta t_{IF,atom}) + \Delta \varepsilon_{L_{IF}}^s \quad (13)$$

deducting the hardware time delay calibration value of the user time terminal to achieve sub-nanosecond level time synchronization from the user time terminal.

2. The method for high-precision time synchronization of virtual atomic clocks according to claim 1, characterized in that: there are a plurality of reference stations whose observations are used to generate virtual grid points, and step S1 is repeated to generate virtual atomic clock information corresponding to each of the plurality of reference stations.

3. A high-precision time synchronization system of virtual atomic clocks, adopting the method for high-precision time synchronization of virtual atomic clocks as claimed in claim 1, wherein the high-precision time synchronization system of virtual atomic clocks comprises:
- a GNSS real-time observations receiving and distributing module, used to access and distribute GNSS observations from the GNSS reference station network and the user time terminals;
- a differential corrections receiving and decoding module, used to access time service corrections generated by the WPT system and decode the time service corrections to obtain decoded differential corrections; and
- a local clock solving module, used to solve local clock offsets in parallel based on the GNSS observations of the GNSS reference station network and the decoded differential corrections, and using a WPT high-precision time transfer method to correct various errors of a link; and
- a GNSS observations reconstruction module, used to deduct the local clock offsets, regenerate and encode the observations of the reference stations in accordance with the standard RTCM format; and
- a virtual atomic clock data broadcasting module, used to encode and broadcast the high-precision time service information to the user time terminals.

* * * * *